US012089024B2

(12) United States Patent
Xiao et al.

(10) Patent No.: US 12,089,024 B2
(45) Date of Patent: Sep. 10, 2024

(54) MULTIFUNCTIONAL SOUNDING DEVICE AND ELECTRONIC DEVICE

(71) Applicants: AAC Microtech (Changzhou) Co., Ltd., Changzhou (CN); AAC ACOUSTIC TECHNOLOGIES (SHENZHEN) CO., LTD., Shenzhen (CN)

(72) Inventors: Bo Xiao, Shenzhen (CN); Chenliang Kong, Shenzhen (CN); Tong Zhang, Shenzhen (CN); Ronglin Linghu, Shenzhen (CN)

(73) Assignees: AAC Microtech (Changzhou) Co., Ltd., Changzhou (CN); AAC Acoustic Technologies (Shenzhen) Co., Ltd., Shenzhen (CN)

( * ) Notice: Subject to any disclaimer, the term of this patent is extended or adjusted under 35 U.S.C. 154(b) by 184 days.

(21) Appl. No.: 17/975,582

(22) Filed: Oct. 27, 2022

(65) Prior Publication Data

US 2023/0328444 A1 Oct. 12, 2023

(51) Int. Cl.
*H04R 1/02* (2006.01)
*H04R 9/02* (2006.01)
*H04R 9/04* (2006.01)
*H04R 9/06* (2006.01)

(52) U.S. Cl.
CPC ............... *H04R 9/025* (2013.01); *H04R 1/02* (2013.01); *H04R 1/025* (2013.01); *H04R 9/043* (2013.01); *H04R 9/06* (2013.01); *H04R 2400/07* (2013.01); *H04R 2400/11* (2013.01); *H04R 2499/11* (2013.01)

(58) Field of Classification Search
CPC .......... H04R 1/02; H04R 1/025; H04R 9/025; H04R 9/043; H04R 9/06; H04R 2400/07; H04R 2400/11; H04R 2499/11
See application file for complete search history.

(56) References Cited

U.S. PATENT DOCUMENTS

2012/0177244 A1* 7/2012 Liu .......................... H04R 7/18 381/396
2020/0059732 A1* 2/2020 Zhou ........................ H04R 1/02
2022/0320984 A1* 10/2022 Li .......................... H02K 33/02

* cited by examiner

*Primary Examiner* — Huyen D Le
(74) *Attorney, Agent, or Firm* — W&G Law Group

(57) ABSTRACT

Provided is a multifunctional sounding device and an electronic device. The multifunctional sounding device includes a casing, a sounding body accommodated in the casing, a vibrator assembly and an elastic supporting member for suspending the vibrator assembly in the accommodating space and providing elastic restoring force. The sounding body includes a vibration system and a magnetic circuit system for driving the vibration system to sound. The elastic supporting member includes a first supporting arm fixed to the vibrator assembly, bent portions bent and extended from both ends of the first supporting arm, and second supporting arms extended away from the first supporting arm and both fixed to the casing. A thickening member is arranged on each bent portion, and a sum of a thicknesses of each bent portion and the thickening member is greater than a thicknesses of the first supporting arm and the second supporting arm.

10 Claims, 5 Drawing Sheets

MULTIFUNCTIONAL SOUNDING DEVICE AND ELECTRONIC DEVICE

TECHNICAL FIELD

The present application relates to the technical field of motors, in particular to a multifunctional sounding device and an electronic device.

BACKGROUND

With the introduction of new consumer electronic products and the continuous development of electronic technologies, multi-functional sounding devices commonly adopted in electronic devices to generate vibration are increasingly used in mobile communication terminals, medical care devices and other fields. The multifunctional sounding devices can not only remind the user by the vibration of the machine body, but also improve the user's experience by the vibration of the body.

A multifunctional sounding device in the related art usually includes a stator system, a vibrator assembly, an elastic supporting assembly and a casing. The elastic supporting assembly is configured to support the vibrator assembly to be suspended in the casing. However, the traditional elastic supporting assembly usually has a bent weak portion, where the stresses are relatively concentrated, so that the bent weak portion is easy to break under long-term vibration conditions, affecting the service life and stability of the multi-functional sounding device.

SUMMARY

In view of the above, the present application provides a multifunctional sounding device and an electronic device, so as to solve the problems of short service life and poor stability of the multifunctional sounding device in the related art.

The present application provides a multifunctional sounding device, comprising a casing with an accommodating space; a sounding body accommodated in the accommodating space, comprising a vibration system accommodated in the casing; and a magnetic circuit system for driving the vibration system to vibrate and sound;

a vibrator assembly; and an elastic supporting assembly for suspending the vibrator assembly in the accommodating space and providing an elastic restoring force for the vibrator assembly, comprising:

at least one elastic supporting member arranged between the vibrator assembly and the casing, comprising a first supporting arm fixed to the vibrator assembly; bent portions bent and extended from both ends of the first supporting arm; and second supporting arms extended away from the first supporting arm from one end of the bent portions away from the first supporting arm and both fixed to the casing;

wherein a thickening member is arranged on each of the bent portions, and a sum of a thicknesses of each of the bent portions and the thickening member is greater than a thicknesses of the first supporting arm and a thicknesses of the second supporting arm.

In one possible design, each of the thickening members is attached to a surface of each of the bent portions close to a side of the vibrator assembly.

In one possible design, each of the thickening members and each of the bent portions are integrally formed.

In one possible design, the elastic supporting member is integrally formed.

In one possible design, the vibrator assembly comprises a mass block and a vibrator coil, wherein the elastic supporting members are arranged on opposite sides of the mass block along a vibration direction of the mass block; the mass block comprise a protrusion block protruded along the vibration direction of the mass block, and the elastic supporting member is fixed on the mass block through the protrusion block.

In one possible design, the mass block comprises a bottom wall and a side wall bent and extended from the bottom wall toward the vibration system, and the vibrator assembly comprises a vibrator coil; the bottom wall is provided with an accommodating cavity, and the vibrator coil is embedded in the accommodating cavity and is arranged at intervals from the magnetic circuit system correspondingly.

In one possible design, the casing comprises a bottom plate arranged close to a side of the vibrator assembly away from the vibration system, and an upper casing for surrounding the accommodating space with the bottom plate; a through hole is arranged through the mass block, and the bottom plate is provided with an arch toward the mass block, and the arch passes is abutted against the magnetic circuit system through the through hole.

In one possible design, a welding piece is provided at a connecting portion between the casing and the elastic supporting member.

In one possible design, the elastic supporting member is a metal member or a plastic member.

The multifunctional sounding device provided by the present application is equipped with the thickening member, so as to improve a structural strength of the elastic supporting member, effectively increase a support rigidity of the elastic supporting assembly, and improve a low-order mode of the multifunctional sounding device, thereby solving the problems of short service life and poor stability of the multifunctional sounding device in the related art.

The present application further provides an electronic device, comprising any one of the above-mentioned multifunctional sounding devices. It can be understood that the electronic device comprises any one of the above-mentioned multifunctional sounding devices, so it obviously has the advantages of the above-mentioned multifunctional sounding devices.

Other features and advantages of the embodiments of the present application will be described in the following description, and will be apparent from the description partly, or may be learned by practice of the embodiments of the present application. The objectives and other advantages of the embodiments of the present application will be realized and obtained by the structure particularly pointed out in the description and accompanying drawings.

BRIEF DESCRIPTION OF THE DRAWINGS

In order to illustrate technical solutions of the embodiments of the present application more clearly, the accompanying drawings required in the embodiments will be briefly introduced below. Obviously, the accompanying drawings in the following description are only some embodiments of the present application. For those of ordinary skill in the art, other drawings may also be obtained from these accompanying drawings without creative effort.

LAYERS IN THE ACCOMPANYING DRAWINGS

Figure 1:
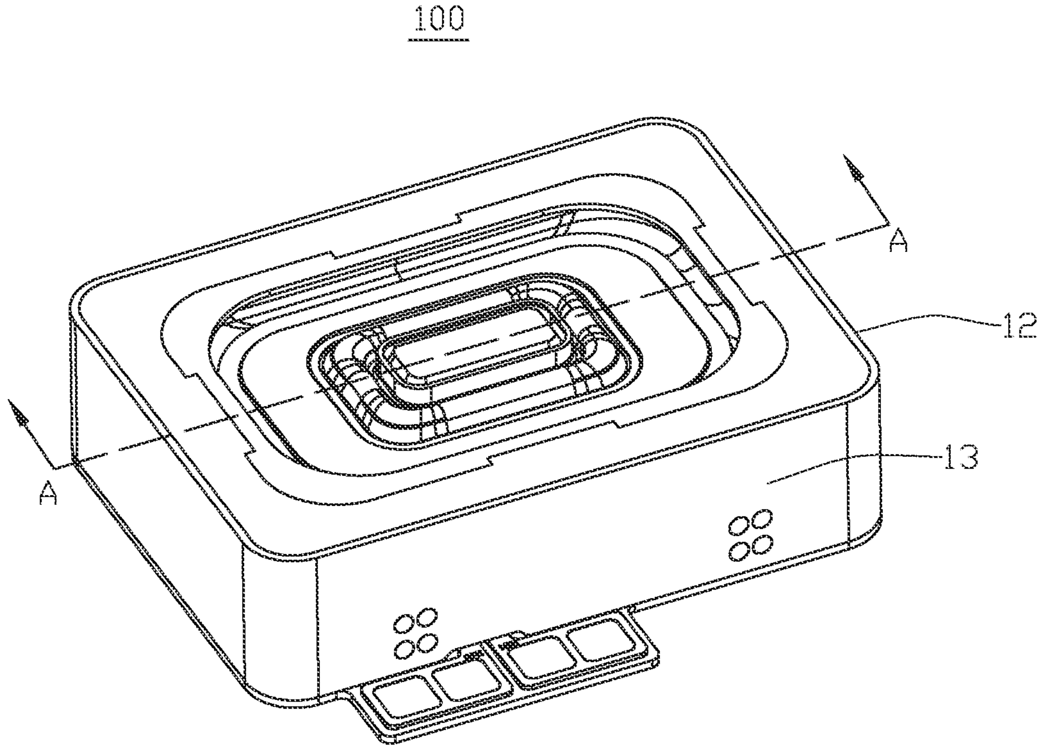
FIG. 1 is a perspective view of a multifunctional sounding device according to an embodiment of the present application.

100, multifunctional sounding device; 1, casing; 11, accommodating space; 12, first side wall; 13, second side wall; 14, top plate; 15, bottom plate; 151, arch; 16, welding piece; 2, vibrator assembly; 21, vibrator coil; 22, mass block; 221, accommodating cavity; 222, through hole; 23, protrusion block; 3, stator system; 31, magnetic steel assembly; 311, main magnet steel; 312, auxiliary magnet steel; 4, elastic supporting assembly; 41, elastic supporting member; 411, first supporting arm; 411*a*, first fixing portion; 412, second supporting arm; 412*a*, second fixing portion; 413, bent portion; 414, thickening member; 5, sounding body; 51, vibration system; 511, vibration coil; 512, sounding diaphragm; 513, supporting plate.

The accompanying drawings, which are incorporated in and constitute a part of this specification, illustrate embodiments consistent with the present application and are used to explain the principles of the present application together with the description.

DETAILED DESCRIPTION OF THE EMBODIMENTS

In order to better understand the technical solutions of the present application, the embodiments of the present application are described in detail below with reference to the accompanying drawings.

It should be clear that the described embodiments are only a part of the embodiments of the present application, but not all of the embodiments. Based on the embodiments in the present application, all other embodiments obtained by those of ordinary skill in the art without creative efforts shall fall within the protection scope of the present application.

The terms used in the embodiments of the present application are only for the purpose of describing specific embodiments, and are not intended to limit the present application. The singular forms "a", "an" and "the" used in the embodiments of the present application and the appended claims are also intended to include the plural forms, unless the context clearly dictates otherwise.

It should be understood that the term "and/or" used in this document is only an association relationship to describe associated objects, indicating that there may be three kinds of relationships. For example, A and/or B may indicate three cases of A alone, A and B, and B alone. In addition, the character "/" in this document generally indicates that the related objects are in an "or" relationship.

It should be noted that the directional words such as "up", "down", "left" and "right" described in the embodiments of the present application are described from the angles shown in the drawings, and should not be construed as implementing the embodiments of the present application. In this context, it should also be understood that, when it is mentioned that an element is connected to an "upper" side or a "lower" side of the other element, it may not only be directly connected to the "upper" side or the "lower" side of the other element, but also be indirectly connected to the "upper" side or the "lower" side of the other element through an intermediate element.

Specific embodiments will be described below according to a structure of the multifunctional sounding device provided by the embodiments of the present application.

In the multifunctional sounding device 100, an elastic supporting member 41 can suspend a vibrator assembly 2 in an accommodating space 11 and provide an elastic restoring force for the vibrator assembly 2. Due to a limitation of a size of the accommodating space 11 of the casing 1 and a specific structure of the vibrator assembly 2, the elastic supporting member 41 often needs to be bent and arranged between the vibrator assembly 2 and the casing 1. In this way, during the long-term vibration of the vibrator assembly 2, bent portions 413 of the elastic supporting member 41 are subject to long-term reciprocating stress, and a magnitude of the stress is related to an attractive force and a repulsive force between the vibrator assembly 2 and the magnetic circuit system. Under long-term vibration, the bent portions 413 of the elastic supporting member 41 is prone to fatigue fracture, which in turn leads to a failure of the entire multifunctional sounding device 100. In addition, since the multifunctional sounding device 100 is gradually developing towards miniaturization, it is extremely difficult to repair the elastic supporting member 41 after it is broken. Therefore, it is an urgent problem for designers of the multifunctional sounding device 100 to design an elastic supporting member 41 with a good structural strength and not easily damaged.

In view of the above, the present application provides a multifunctional sounding device 100, referring to FIGS. 1-5, the multifunctional sounding device 100 includes a casing 1 having an accommodating space 11 and a sounding body 5 accommodated in the accommodating space 11. The sounding body 5 includes a vibration system 51 accommodated in the casing 1 and a magnetic circuit system for driving the vibration system 51 to emit sound. The multifunctional sounding device 100 further includes a vibrator assembly 2 and an elastic supporting assembly 4 for suspending and supporting the vibrator assembly 2 in the accommodating space 11 and providing elastic restoring force for the vibrator assembly 2. The elastic supporting assembly 4 includes at least one elastic supporting member 41 arranged between the vibrator assembly 2 and the casing 1. The elastic supporting member 41 includes a first supporting arm 411 fixed to the vibrator assembly 2, bent portions 413 bent and extended from both ends of the first supporting arm 411 and second supporting arms 412 extended away from the first supporting arm 411 from one end of the bent portions 413 away from the first supporting arm 411 and both fixed to the casing 1. Each of the bent portions 413 is provided with a thickening piece 414, and a sum of a thicknesses of each bent portion 413 and each thickening piece 414 is greater than a thickness of the first supporting arm 411 and a thickness of the second supporting arm 412.

The casing 1 may be a square casing 1, and a square accommodating space 11 may be provided in its interior. The magnetic circuit system is fixedly arranged in the accommodating space 11, and the vibration system 51 is suspended in the accommodating space 11 by the elastic supporting assembly 4. The vibration system 51 and the magnetic circuit system are at a certain distance, so as to avoid interference with the magnetic circuit system when the vibration system 51 moves.

Figure 5:
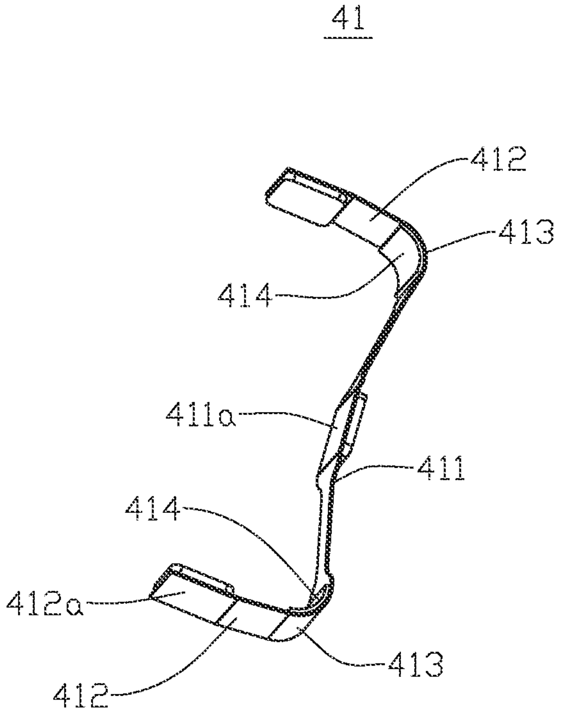
FIG. 5 is a structural view of an elastic supporting member according to an embodiment of the present application.

The magnetic circuit system may be provided with common magnetic components (such as magnets), which is mainly configured to provide a stable magnetic field, so as to generate a force that interacts with the magnetic circuit system when the coil in the vibration system 51 is energized. Since the magnetic circuit system is fixed and the vibration system 51 is suspended, the vibration system 51 will move under the driving of the energized coil. Referring to FIG. 5, one or more elastic supporting members 41 may be provided, and a plurality of elastic supporting members 41 constitute the elastic supporting assembly 4. The elastic supporting member 41 may include bent portions 413 bent and extended from both ends of the first supporting arm 411 and second supporting arms 412 extended away from the first supporting arm 411 from one end of the bent portions 413 away from the first supporting arm 411 and both fixed to the casing 1. The first supporting arm 411 and the second supporting arm 412 are arranged at a certain included angle, that is, a connecting portion between the first supporting arm 411 and the second supporting arm 412 is bent to form the bent portion 413. The setting of the included angle can not only increase a toughness of the elastic supporting member 41, but also better adapt to a gap between the vibration system 51 and the casing 1.

One end of each second supporting arm 412 away from the first supporting arm 411 is provided with a second fixing portion 412*a* connected to the casing 1. The first supporting arm 411 is provided with a first fixing portion 411*a* connected to the vibration system 51. The first fixing portion 411*a* and the second fixing portion 412*a* may be a common connection structure such as riveting, clamping and welding, as long as the connection can be ensured stably.

The thickening members 414 may be a cube structure, which may be arranged on the bent portions 413. Specifically, the thickening member 414 may be arranged on an inner surface of the bent portions 413 or an outer surface of the bent portions 413. By providing the thickening members 414, a structural strength of the bent portions 413 is improved and a supporting rigidity of the elastic supporting assembly 4 is effectively increased, thereby solving the problems of short service life and poor stability of the multifunctional sounding device 100 in the related art.

In one embodiment, each thickening member 414 is attached to a surface of each bent portion 413 on a side close to the vibrator assembly 2.

The thickening members 414 and the bent portions 413 may be produced independently. After the two are made, they are connected and fixed by means of gluing or other connection manner. After the two are attached to each other, the structural strength of the bent portions 413 can be improved, and the supporting rigidity of the elastic supporting assembly 4 is effectively increased. In this embodiment, since the thickening members 414 and the bent portions 413 are two independent portions, a shape and a structure of the thickening members 414 may be adjusted flexibly, so that they can better fit and support the bent portions 413, thereby improves the adaptability and stability of the thickening member 414.

In one embodiment, each thickening member 414 and each bent portion 413 are integrally formed.

The thickening members 414 may be integrally formed with the bent portions 413 by means of stamping, injection molding or die casting. Specifically, a production mold of the elastic supporting member 41 may be adjusted during its manufacturing process, so as to make the thickening members 414 and the bent portions 413 integrally formed, so that the integrity of the thickening members 414 and the bent portions 413 is improved and a structural strength of the bent portions is further improved. Besides, the integrated molding technology can also reduce the assembly process and save the cost.

In one embodiment, the elastic supporting member 41 is integrally formed.

An overall structure of the elastic supporting member 41 may also be integrally formed by means of stamping, injection molding or die casting. Specifically, a production mold of the elastic supporting member 41 may be adjusted during its manufacturing process, so as to make the elastic supporting member 41 integrally formed, so that the integrity of the elastic supporting member 41 is improved and a structural strength of the elastic supporting member 41 is further improved. Besides, the integrated molding technology can also reduce the assembly process and save the cost.

In conclusion, the elastic supporting member 41 enables the vibration system 51 to be more stably suspended in the accommodation space 11 of the casing 1, and further improves the structural strength of the elastic supporting member 41.

Figure 3:
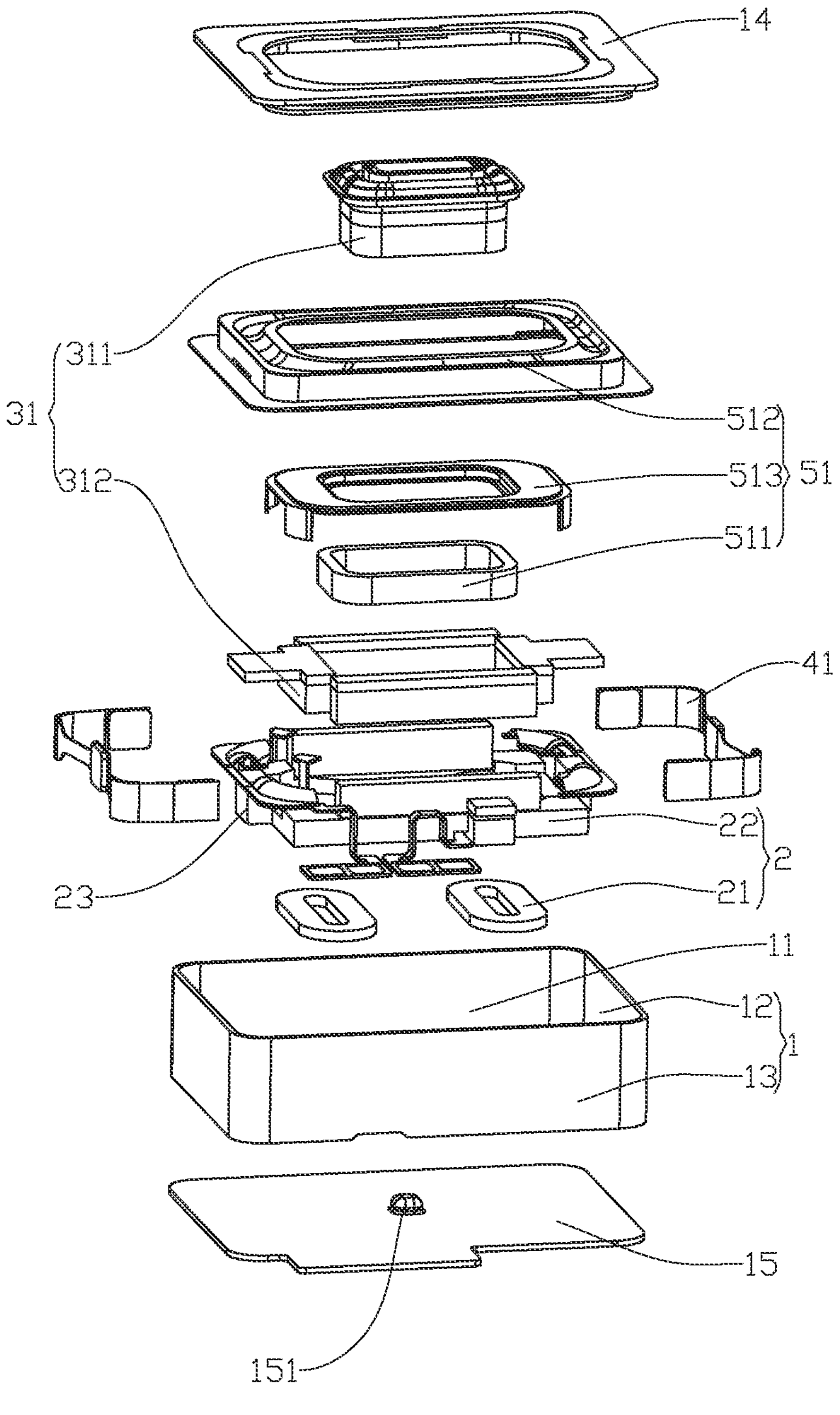
FIG. 3 is an exploded view of the multifunctional sounding device according to an embodiment of the present application.
Figure 4:
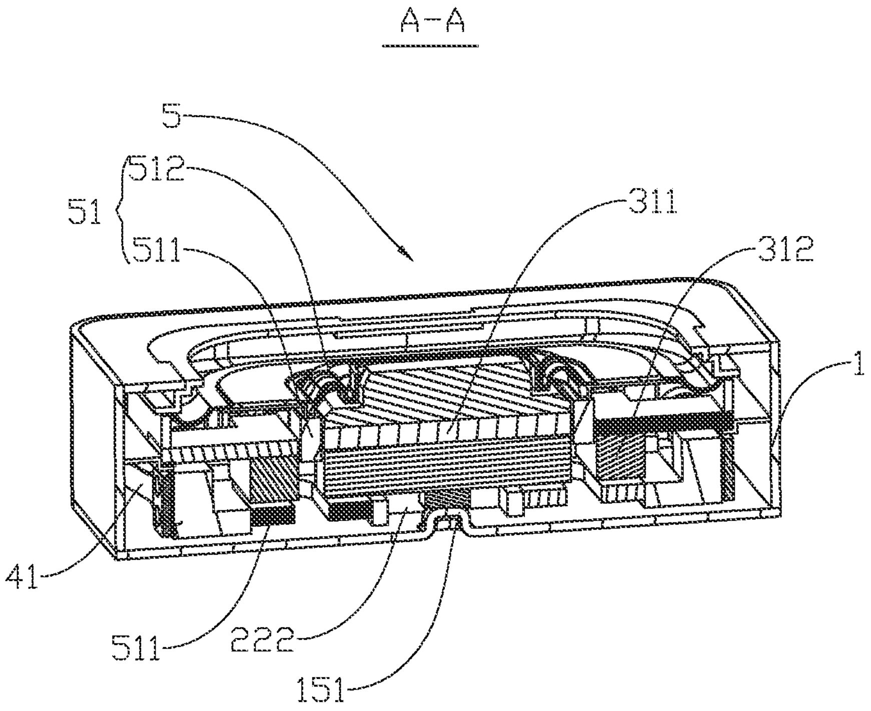
FIG. 4 is a sectional view of the multifunctional sounding device along a line A-A according to an embodiment of the present application.

In one embodiment, referring to FIG. 3 and FIG. 4, the vibrator assembly 2 includes a mass block 22 and a vibrator coil 21, and the elastic supporting members 41 are respectively arranged on opposite sides of the mass block 22 along a vibration direction of the mass block 22. The mass block 22 is provided with protrusion blocks 23 protruded along the vibration direction of the mass block 22. The elastic supporting members 41 are fixed to the mass block 22 through the protrusion blocks 23.

The casing 1 may be jointly enclosed by two first side walls 12, and two second side walls 13 connected to the first side walls 12 and arranged opposite to each other. Further, the casing 1 may further include a top plate 14 arrange above the first side walls 12 and the second side walls 13 and a bottom plate 15 arranged below the first side walls 12 and the second side walls 13. The top plate 14 and the bottom plate 15 are configured to enclose the accommodation space 11. The vibrator assembly 2 is suspended in the casing 1. The vibrator assembly 2 includes a mass block 22 and a vibrator coil 21. The mass block 22 may be a square block structure, and two elastic supporting members 41 are respectively arranged on opposite sides of the mass block 22 along the vibration direction of the mass block 22. The two ends of the mass block 22 may be respectively provided with two protrusion blocks 23. The two protrusion blocks 23 are arranged along the vibration direction of the mass block 22 and are respectively fixed with the two elastic supporting members 41, and the fixing method may be welding, riveting or gluing.

In this embodiment, two elastic supporting members 41 oppositely arranged are further provided. By connecting the two elastic supporting members 41 to the two protrusion blocks 23 respectively, the vibrator assembly 2 can be stably suspended in the accommodating space 11 of the casing, thereby improving the vibration stability of the vibrator assembly 2. The elastic supporting members 41 are connected to the two second side walls 13 and the vibrator assembly 2, so that the supporting force on the vibrator assembly 2 is more balanced, further improving the connection stability.

In one embodiment, the mass block 22 includes a bottom wall and a side wall bent and extended from the bottom wall toward the vibration system 51. The vibrator assembly 2 includes vibrator coils 21, and the bottom wall is provided with an accommodating cavity 221. The vibrator coils 21 are embedded in the accommodating cavity 221 and arranged at intervals from the magnetic circuit system correspondingly.

Referring to FIG. 3 and FIG. 4, an axial direction of each vibrator coil 21 is perpendicular to the vibration direction of the mass block 22. The number of vibrator coils 21 may be set to one or more. The mass block 22 is provided with an accommodation cavity 221 for accommodating the vibrator coils 21. The magnetic circuit system includes a magnetic steel assembly 31 arranged at intervals from the vibration system 51, and the magnetic steel assembly 31 in the magnetic circuit system is arranged at a certain distance from the vibration system 51.

The magnetic steel assembly 31 may include a plurality of magnets with different sizes and the same or different polarity. For example, the magnetic steel assembly 31 may include a main magnetic steel 311 located in a center and an auxiliary magnet 312 located around the main magnetic steel 311. The specific arrangement and magnetic field strength are selected according to the practical situation. In this way, the vibrator coil 21 is stressed and drives the mass block 22 to move during an electrification process.

In one embodiment, the casing 1 includes the bottom plate 15 arranged close to a side of the vibrator assembly 2 away from the vibration system 51 and an upper shell enclosed the accommodating space with the bottom plate 15. The mass block 22 is provided with a through hole 222, and the bottom plate 15 is provided with an arch 151 facing toward the mass block 22, and the arch 151 is abutted against the magnetic circuit system through the through hole 222.

Referring to FIG. 4, the upper casing may include two first side walls 12 arranged oppositely, and two second side walls 13 connected to the first side walls 12 and arranged oppositely. In order to improve the stability during vibration, a through hole 222 may be provided in a middle of the mass block 22, and the arch 151 is provided in the bottom plate 15 facing toward the mass block 22. The arch 151 may be a boss structure protruded upward in the middle of the bottom plate 15. The arch 151 is abutted against the magnetic circuit system through the through hole 222.

In one embodiment, a connection portion between the casing 1 and the elastic supporting member 41 is provided with a welding piece 16.

Figure 2:
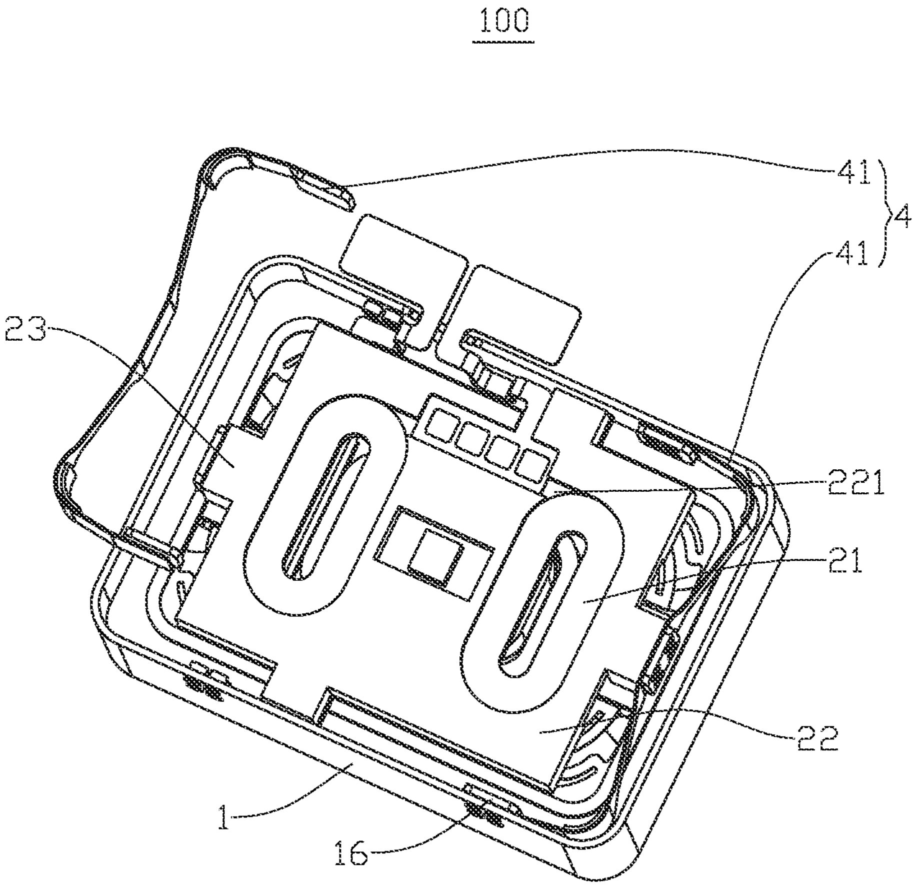
FIG. 2 is a structural view of the multifunctional sounding device with a lower casing removed according to an embodiment of the present application.

Referring to FIG. 1 and FIG. 2, arranging the welding piece 16 on the casing 1 can facilitate the welding connection between the elastic supporting member 41 and the casing 1, which improves the stability of the connection and the convenience of the connection.

In one embodiment, the elastic supporting member 41 is a metal member or a plastic member. When the elastic supporting member 41 is made of plastic material, the cost can be saved. Besides, the plastic has strong toughness, which can ensure the service life of the elastic supporting member 41. The elastic supporting member 41 may also be made of metal materials, such as iron and aluminum. The elastic supporting member 41 made of metal material has a better structural strength and can also ensure the service life of the elastic supporting member 41.

In one embodiment, the vibration system 51 accommodated in the casing 1 includes a vibration coil 511 and a sounding diaphragm 512 connected to the vibration coil 511. The vibration system 51 may further include a supporting plate 513 for supporting the sounding diaphragm 512. The magnetic steel assembly 31 includes a plurality of magnets, and there is a magnetic gap among plurality of magnets. The vibration coil 511 is arranged in a range of a magnetic field line of the magnets. The vibrating coil 511 may be connected to a circuit board, so that the vibrating coil 511 can be energized with alternating current. When the vibrating coil 511 is energized, the vibrating coil 511 generates a force that attracts or repels the magnetic steel assembly 31, and the vibrating coil 511 is subjected to force and drives the sounding diaphragm 512 to vibrate, thereby sounding.

The present application further provides an electronic device, and the electronic device includes any one of the above-mentioned multifunctional sounding devices 100. It can be understood that the electronic device includes any one of the above-mentioned multifunctional sounding devices 100, so it obviously has the advantages of the above-mentioned multifunctional sounding device 100. Specifically, the multifunctional sounding device 100 may be applied to products such as mobile phones, tablet computers, notebook computers, car machines, point-of-sale terminals, walkmans, smart bracelets, smart watches, augmented reality devices or virtual reality devices.

Described above are only preferred embodiments of the present application, and are not intended to limit the present application. Any modification, equivalent replacement, or improvement made within the spirit and principle of the present application shall be included in the protection scope of the present application.

What is claimed is:

1. A multifunctional sounding device, comprising:
a casing with an accommodating space;
a sounding body accommodated in the accommodating space, comprising:
a vibration system accommodated in the casing; and
a magnetic circuit system for driving the vibration system to vibrate and sound;
a vibrator assembly; and
an elastic supporting assembly for suspending the vibrator assembly in the accommodating space and providing an elastic restoring force for the vibrator assembly, comprising:
at least one elastic supporting member arranged between the vibrator assembly and the casing, comprising:
a first supporting arm fixed to the vibrator assembly;
bent portions bent and extended from both ends of the first supporting arm; and
second supporting arms extended away from the first supporting arm from one end of the bent portions away from the first supporting arm and both fixed to the casing;
wherein a thickening member is arranged on each of the bent portions, and a sum of a thicknesses of each of the bent portions and the thickening member is greater than a thicknesses of the first supporting arm and a thicknesses of the second supporting arm.

2. The multifunctional sounding device of claim 1, wherein each of the thickening members is attached to a surface of each of the bent portions close to a side of the vibrator assembly.

3. The multifunctional sounding device of claim 1, wherein each of the thickening members and each of the bent portions are integrally formed.

4. The multifunctional sounding device of claim 3, wherein the elastic supporting member is integrally formed.

5. The multifunctional sounding device of claim 1, wherein the vibrator assembly comprises a mass block and a vibrator coil, wherein the elastic supporting members are arranged on opposite sides of the mass block along a vibration direction of the mass block; the mass block comprise a protrusion block protruded along the vibration direction of the mass block, and the elastic supporting member is fixed on the mass block through the protrusion block.

6. The multifunctional sounding device of claim 5, wherein the mass block comprises a bottom wall and a side wall bent and extended from the bottom wall toward the vibration system, and the vibrator assembly comprises a vibrator coil; the bottom wall is provided with an accommodating cavity, and the vibrator coil is embedded in the accommodating cavity and is arranged at intervals from the magnetic circuit system correspondingly.

7. The multifunctional sounding device of claim 5, wherein the casing comprises a bottom plate arranged close to a side of the vibrator assembly away from the vibration system, and an upper casing for surrounding the accommodating space with the bottom plate; a through hole is arranged through the mass block; the bottom plate is provided with an arch toward the mass block, and the arch passes is abutted against the magnetic circuit system through the through hole.

8. The multifunctional sounding device of claim 5, wherein a welding piece is provided at a connecting portion between the casing and the elastic supporting member.

9. The multifunctional sounding device of claim 1, wherein the elastic supporting member is a metal member or a plastic member.

10. An electronic device, comprising the multifunctional sounding device of claim 1.

* * * * *